United States Patent [19]
Hamilton

[11] 3,760,520
[45] Sept. 25, 1973

[54] FIELD FORMATION DISPLAY DEVICE

[76] Inventor: John M. Hamilton, 4320 Cole Ave., Dallas, Tex. 75205

[22] Filed: Sept. 27, 1971

[21] Appl. No.: 183,867

[52] U.S. Cl. .............. 40/102, 283/63 R, 35/35 E, 40/126 A
[51] Int. Cl. .......................................... G09f 19/00
[58] Field of Search ..................... 273/94 R, 55; 35/35 R, 35 E; 283/63 R, 46

[56] References Cited
UNITED STATES PATENTS

| | | | |
|---|---|---|---|
| 698,603 | 4/1902 | Wiederseim | 283/63 R |
| 462,956 | 11/1891 | McLoughlin | 283/63 R |
| 680,311 | 8/1901 | Browne | 283/46 R |
| 2,163,978 | 6/1939 | Ivanek | 35/7 R X |

FOREIGN PATENTS OR APPLICATIONS 100,989   8/1916   Great Britain ..................... 35/35 E

*Primary Examiner*—Robert W. Michell
*Assistant Examiner*—J. H. Wolff
*Attorney*—Giles C. Clegg, Jr.

[57]   ABSTRACT

Disclosed is a device for aligning diagrammatic illustrations of football team formations in juxtaposed relationships. The device may be formed of a sheet of paper foldable along parallel lines dividing the sheet into three panels of approximately identical dimensions. Basic field formations of the opposing teams are illustrated on the faces of the panels.

3 Claims, 7 Drawing Figures

PATENTED SEP 25 1973
3,760,520
SHEET 1 OF 2
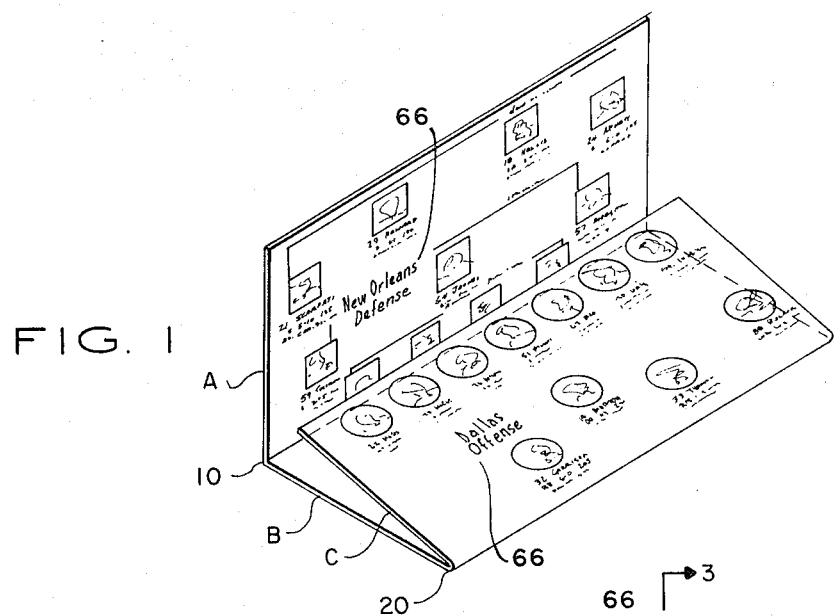
FIG. 1
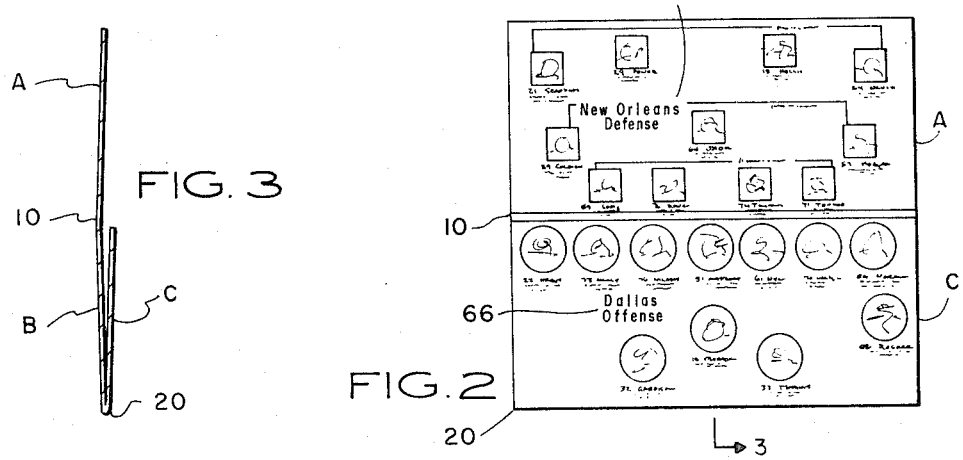
FIG. 3
FIG. 2
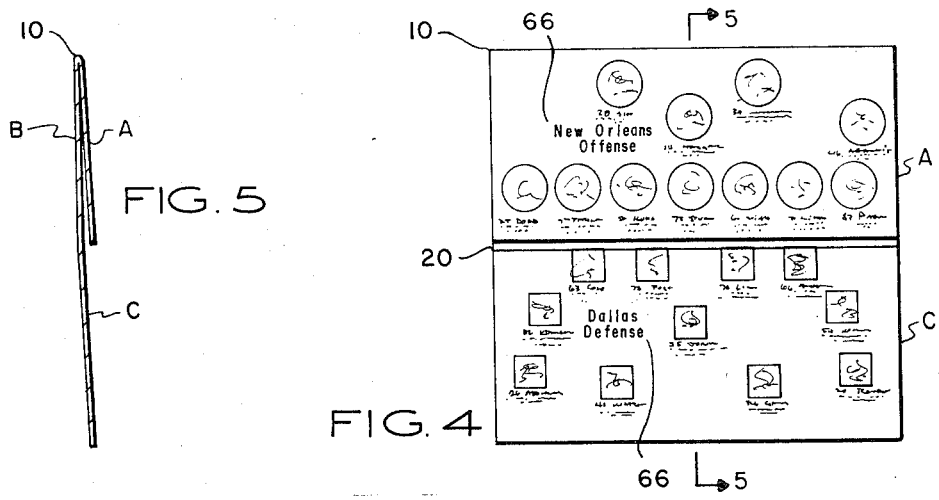
FIG. 5
FIG. 4

FIELD FORMATION DISPLAY DEVICE

This invention relates to visual display devices diagrammatically illustrating opposing team player positions More particularly, it relates to a foldable sheet having diagrammatic information imprinted thereon permitting opposing teams to be aligned diagrammatically by selectively folding panels of the sheet in abutting positions.

At most organized sports events, such as football games and the like, the players wear numbered jerseys and programs are provided for the spectators whereby the individual player may be identified by the number on his jersey. However, on many occasions the spectator is unable to immediately recognize or identify the number on the player's jersey but is able to identify the position from which the player is playing and wishes to immediately identify the player. With conventional programs the spectator must first identify the player by the number on his jersey and then locate the corresponding number and player identity in the printed program. Moreover, in many sporting invents such as football and the like the spectator is interested in the name of the player playing in a position immediately opposite the corresponding player on the opposing team. To determine such information the spectator must first identify the player by number as he appears on the playing field and then locate the corresponding number in the program to identify the player. Unfortunately, the rosters for the opposing teams are usually not listed at the same physical locations in the program; thus the task of locating players playing in opposing positions on opposing teams is somewhat time consuming.

In accordance with the present invention means is provided for diagrammatically juxapositioning entire team formations of opposing teams in alignments as they appear on the playing field. The diagrammatic information may be used to readily identify any player on either team by the position at which he is playing without reference to a numerical roster or the like.

Briefly, the present invention comprises three attached panels of substantially identical configuration and may be a single sheet foldable along two parallel lines which divide the sheet into three panels of similar dimensions. The offensive and defensive formations of one team are printed on opposite faces of a first panel and the offensive and defensive formations of the opposing team are printed on opposite faces of a second panel. The first and second panels are interconnected by a third panel of similar dimensions. Accordingly, the opposing team formation diagrams may be juxapositioned by simply folding the first panel or second panel over the third panel to position the offensive formation of one team opposite defensive defensive formation of the opposing team. It will immediately be apparent that with the team formation diagrams so aligned the spectator may refer to the diagrammatic illustration and immediately identify the particular player playing at any one position on either the defensive team of one team or the offensive team of the opposing team merely by identifying the position at which the player is playing.

Other features and advantages of the invention will become more readily understood from the following detailed description taken in connection with the appended claims and attached drawings in which:

FIG. 1 is a perspective view of the preferred embodiment of the invention;

FIG. 2 is a plan view of the embodiment of the invention illustrated in FIG. 1 folded to expose the back face of the second panel and the front face of the first panel FIG. 3 is a sectional view of the device of FIG. 2;

FIG. 4 is a plan view of the embodiment of the invention illustrated in FIG. 1 folded to expose the back face of the first panel and the front face of the second panel;

FIG. 5 is a sectional view of the device of FIG. 4;

Figures 6, 7:
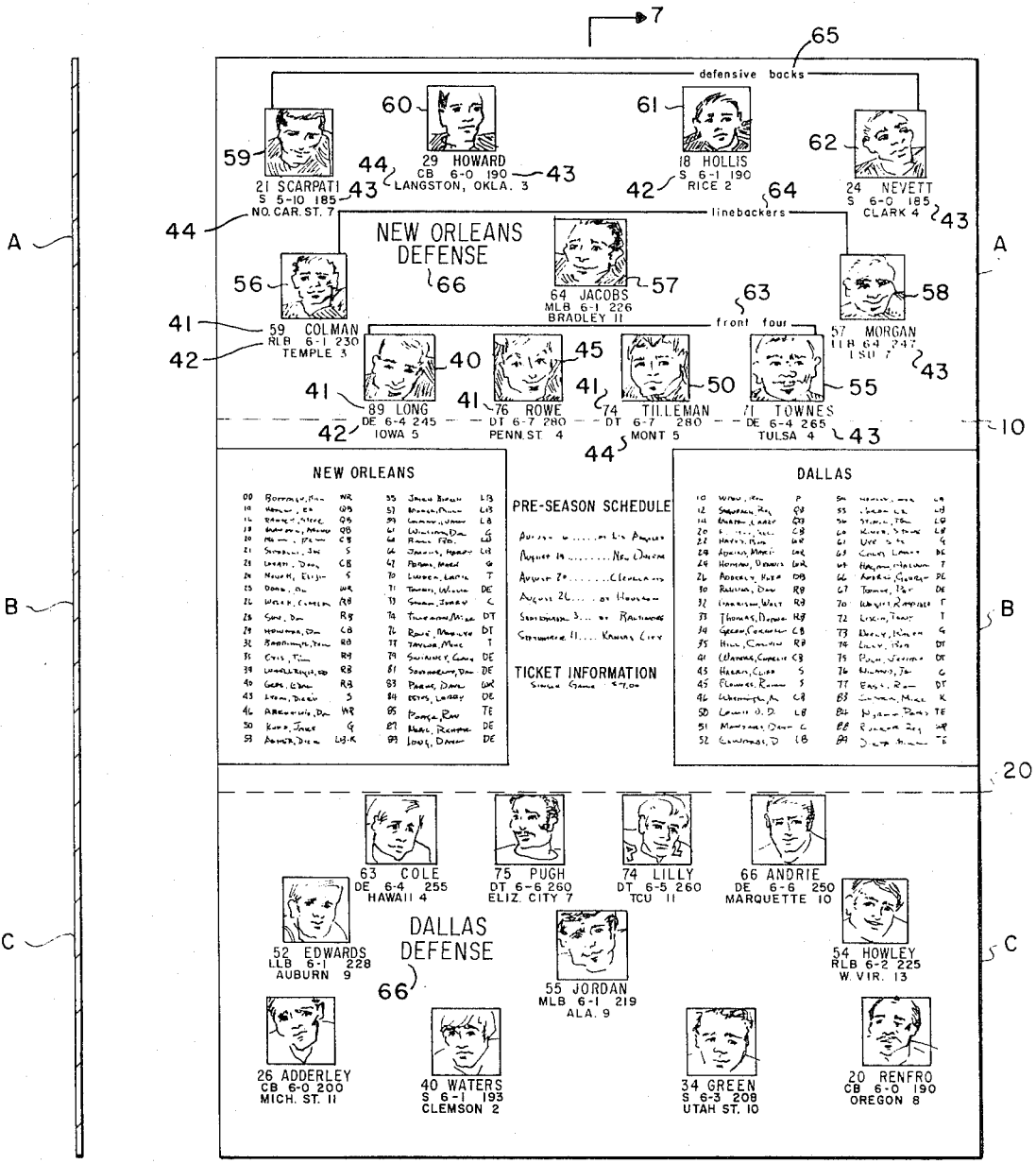
FIG. 6 is a plan view of the front face only of the embodiment illustrated in FIG. 1.
FIG. 7 is a sectional view of the device of FIG. 6.

Referring now to the drawings, there is illustrated a single foldable sheet of paper or like material adapted for folding along parallel lines 10 and 20 to divide the sheet into panels A, B and C of substantially identical dimensions. Diagrammatic representations of football team field formations are printed on both the front and back faces of panels A and C. As best shown in FIG. 6, diagrammatic representations of the basic defensive formations used by the opposing teams are printed or otherwise disposed on the front faces of panels A and C. For purposes of clarity, the illustrations will be referred hereinafter as shown in the drawings showing a first team, such as New Orleans and a second team, such as Dallas. It will be readily understood, however, that the invention may be used in connection with any combination of opposing football teams as well as with other similar sports.

On the front face of panel A the standard basic defensive formation of the New Orleans team is illustrated in diagrammatic form. Accordingly, the four linemen 40, 45, 50, 55 of the New Orleans defense are illustrated along a line at the bottom of the front face of panel A disposed parallel to fold line 10. Immediately above the linemen positions are illustrated the positions of three line backers 56, 57, 58. The defensive backs 59, 60, 61, 62 are arranged along the top of the face of panel A. It will be readily appreciated that the diagrammatic illustration of the defensive formation of the New Orleans players is a conventional diagrammatic representation of the preferred defense as arranged on the playing field with the fold line 10 illustrating the line of scrimmage.

As ilustrated in FIGS. 4 and 5, the basic offensive formation of the New Orleans players is illustrated diagrammatically on the back face of panel A. However, on the back face of panel A the team is aligned with the seven linemen disposed along the edge of the panel opposite folding line 10. Accordingly, in this position the top edge of panel A represents the line of scrimmage. Immediately behind the diagrammatic illustration of the linemen are the conventional illustrations for the backfield positions.

In like manner the basic defensive formation of the Dallas players is shown in diagrammatic form on the front face of panel C; the defensive linemen being aligned along the edge of panel C adjacent fold line 20. The linebackers are disposed immediately below the defensive linemen and the defensive backs arranged along the lower edge of the panel. It will thus be observed when panel A is folded along line 10 as illustrated in FIGS. 4 and 5, the offensive diagrammatic representation of the New Orleans players will be juxapositioned opposite the defensive diagrammatic representation of the Dallas players; the top edge of panel A being superimposed on fold line 20 and representing the line of scrimmage. Thus it will be seen that the spectator, when holding the apparatus of the invention as shown in FIG. 4, will immediately have before him a diagrammatic representation of the offensive formation of the New Orleans players and the defensive formation of the Dallas players juxtaposed on opposite sides of the line of scrimmage represented by fold line 20. In like manner, when panel C is folded upward over panel B along line 20 the bottom edge of panel C will coincide with and be superimposed on fold line 10 and the offensive formation of the Dallas players will be disposed opposite the defensive formation of the New Orleans players as illustrated in FIGS. 2 and 3.

As stated above, the entire offensive and defensive formations of the opposing football teams may be disposed diagrammatically on the faces of the panels. If desired, the spaces indicating each position may contain a photograph of the player, his jersey number 41 and other informative indicia such as usual position 42, age, weight 43, collegiate career 44, number of years in the league or the like.

It will be noted that diagrammatic representations of each team formation are disposed on opposite faces of the top and bottom panels A and C. Panel B serves mainly to support panels A and C a fixed relative distance apart so that either panel A or C may be folded over panel B and thereby dispose either of the opposing team diagrams opposite the other team diagram. However, panel B may preferably have imprinted on the front face thereof a complete team roster of both teams and other information such as the season schedule for either or both the teams or the like.

From the foregoing it will be readily observed that the spectator may use the device of the invention to graphically display team information according to team alignments on the playing field and immediately identify each player without reference to his indentification number. Furthermore, as ball possession changes and offensive and defensive units are changed on the playing field, the spectator merely reverses panels A and C to immediately reveal the new offensive and defensive formations corresponding with the actual formations on the Playing field.

Identification legends 66 are preferably placed on each panel to identify the formation displayed. If desired, additional legends may be used to readily identify player positions in the terminology commonly used. For example, a grouping line and the legend "front four" 63 are used to identify the defensive linemen. Similarly, grouping lines and printed legends 64 and 65 identify the linebackers and defensive backs, respectively.

While the invention has been described with reference to defensive formations displayed on the front face of the panels and offensive formations on the back face, it will be readily appreciated that the arrangement may be reversed.

While the invention has been described with particular reference to a single sheet foldable to form three panels, it will be readily understood that the invention is not so limited. The invention may take the form of rigid panels A and C attached along their edges and spaced apart by means other than panel B. Likewise, the device may be fabricated with a plurality of panels interconnected to allow the spectator to selectively position one of several alternative offensive formations opposite one of several alternative defensive formations.

It is to be understood that although the invention has been described with particular references to specific embodiments thereof, the form of the invention shown and described in detail is to be taken as the preferred embodiment of same, and that various changes and modification may be resorted to without departing from the spirit and scope of the invention as defined by the appended claims.

I claim:

1. A substantially rectangular flexible sheet foldable along two parallel lines dividing said sheet into three panels of substantially equal dimensions, each of the outer panels displaying on their front and back faces respectively offensive and defensive field formations of opposing teams' players so arranged that corresponding formations of each team are oriented with respect to the fold lines on one face of said sheet and oriented with respect to the outer edges parallel to said fold lines on the opposite face of send sheet, so that when a first one of the outer panels is folded along a first one of the parallel lines, the offensive formation of one team is aligned opposite the defensive formation of the other team along a line of scrimmage, and when a second one of the outer panels is folded along a second one of the parallel lines, the defensive formation of said one team is aligned opposite the offensive formation of said other team along a line of scrimmage.

2. The sheet defined in claim 1 wherein the face of the panel intermediate the two outer panels includes printed information relative to the teams' field formations.

3. The sheet defined in claim 1 wherein the displays on the first and second outer panels includes photographs of the players arranged on the panels in positions corresponding to the position of the player on the playing field.

* * * * *